UNITED STATES PATENT OFFICE.

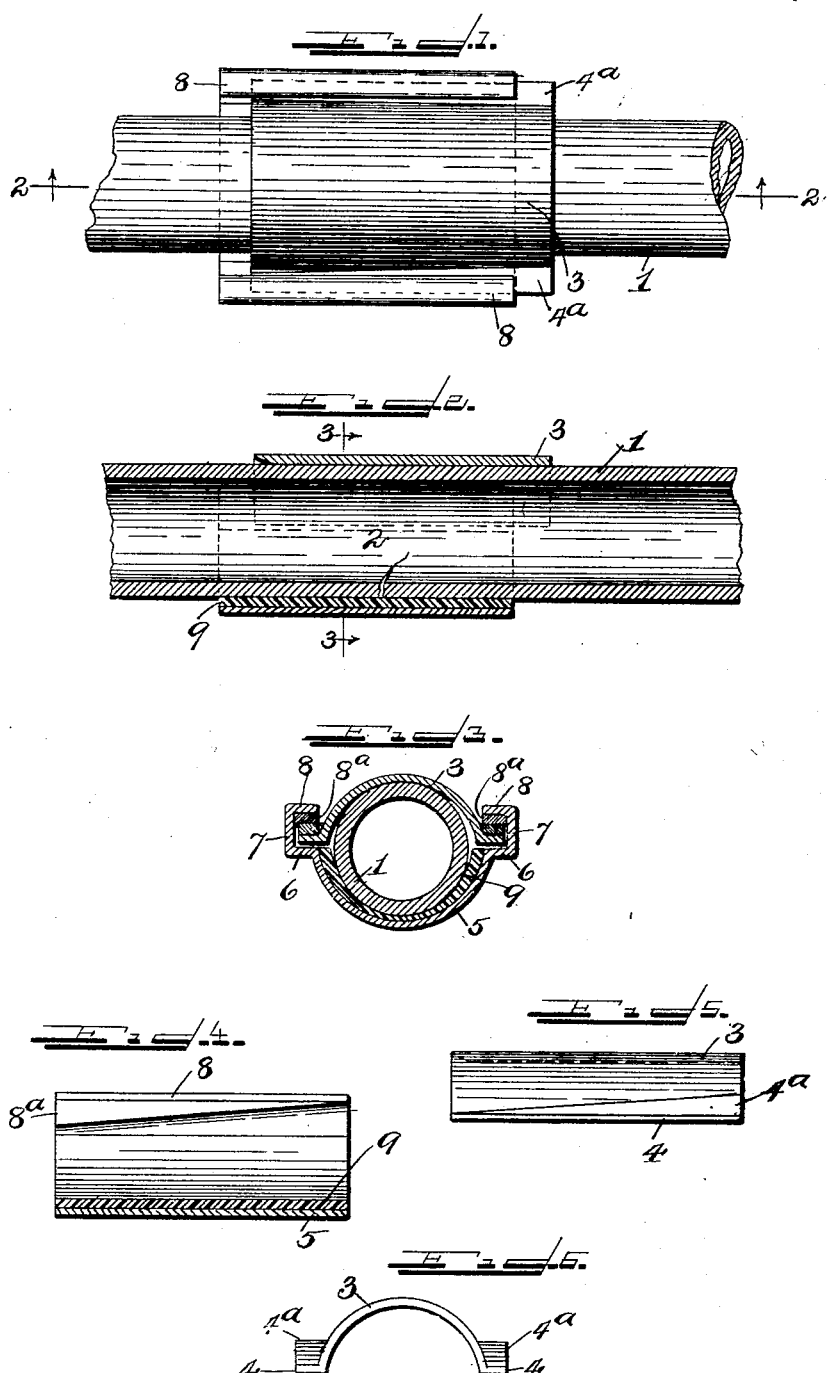

ALBERT A. SINDELAR, OF CHICAGO, ILLINOIS.

DEVICE FOR CLOSING LEAKS IN PIPES.

SPECIFICATION forming part of Letters Patent No. 710,721, dated October 7, 1902.

Application filed April 15, 1901. Serial No. 55,856. (No model.)

*To all whom it may concern:*

Be it known that I, ALBERT A. SINDELAR, a citizen of the United States, residing at Chicago, in the county of Cook and State of Illinois, have invented certain new and useful Improvements in Devices for Closing Leaks in Pipes, of which the following is a full, clear, and exact specification.

My invention relates more particularly to means for closing leaks in water and other pipes, and especially those leaks caused by bursting, which usually occur where the pipe is straight or continuous; and my invention has for its primary object to provide an improved and simple form of clamp or patch which may be readily applied to pipes of different sizes for closing leaks therein.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claim.

In the said drawings, Figure 1 is a plan view of my improved device applied to a pipe. Fig. 2 is a longitudinal sectional view thereof, taken on the line 2 2, Fig. 1. Fig. 3 is a cross-section taken on the line 3 3, Fig. 2. Fig. 4 is a longitudinal section of one of the clamp members, showing the inside thereof. Fig. 5 is a side elevation of the other one of the clamp members, showing the outer side thereof; and Fig. 6 is an end view of the latter member.

1 is a pipe in which is illustrated a crack or leak 2, which is closed by the application of my improved clamp thereto. My improved clamp consists of two members divided longitudinally from each other, so as to be capable of being applied transversely to and clamped upon the pipe. One of these members—the upper one in the position shown in the drawings—consists of a curved plate or semicylindrical portion 3, which approximates the contour of the pipe 1, but need not fit it exactly, and consequently it may be struck on a radius of sufficient length to make it applicable to pipes of various sizes. Formed along each edge of the cylindrical portion 3 is a wedge 4, tapering from right to left in the position shown in the drawings, as clearly illustrated in Fig. 5, said wedges 4 projecting outwardly from the sides of the cylindrical portion 3 in the form of flanges. The other and lower member of the clamp consists of a semicylindrical portion 5, which like the semicylindrical portion 3 approximates the contour of the pipe, but may be larger than the pipe, so as to make it applicable to pipes of various sizes, and when these two portions 3 5 are placed together they constitute an entire inclosure, approximating a complete cylinder in cross-section. Each edge of the semicylindrical portion 5 is provided with an outward lateral bend 6, whose outer edges are turned upwardly or at right angles to the bend 6 and toward the flanges 4, as shown at 7, and along the upper and inner edges of the bend 7 are formed wedges or inclined flanges 8, which overlap and engage with the flanges or wedges 4, the latter fitting into the grooves constituted by the bends 6 and 7 and the inwardly-projecting flanges 8, so that by sliding the two clamp members longitudinally with reference to each other they will be drawn tightly against opposite sides of the pipe when pushed in one direction and will be released therefrom when pushed in the opposite direction.

One of the members, preferably the member 5, is faced inside with a packing 9, composed of rubber, leather, or other suitable yielding or elastic material, which when the clamp members are drawn tightly against the pipe fits over and completely closes the leak in the pipe.

The semicylindrical portions 3 5 are each composed of sheet metal, and the wedge-shape formation of their flanges 4 8 is constituted by brazing or otherwise securing thereto a separate wedge-shape piece. This wedge-shape piece of the flange 4 is indicated at $4^a$ and of the flange 8 at $8^a$; but the members of the clamp might of course be constructed by other methods without departing from the spirit of my invention, this form, however, being preferable over common casting, inasmuch as it permits of more or less elasticity and avoids the risk of breakage.

Having thus described my invention, what I claim as new therein, and desire to secure by Letters Patent, is—

In a device for stopping leaks in pipes the combination of a semicylindrical clamping member provided throughout its inner face with an elastic packing and along its edges with outwardly-turned flanges 6, flanges 7 arranged at an angle to flanges 6, flanges 8 extending inwardly from the edges of flanges 7 parallel longitudinally and in cross-section with the flanges 6, inclined wedging-bars secured to the inner sides of flanges 8, a second semicylindrical clamping member coterminous in length with said first member and having outwardly-turned flanges at its edges extending under said wedging-bars, and a second set of wedging-bars secured to the last said flanges and engaging said first wedging-bars between the latter and said flanges 6, substantially as set forth.

ALBERT A. SINDELAR.

Witnesses:
EDNA B. JOHNSON,
F. A. HOPKINS.